Figure 1:
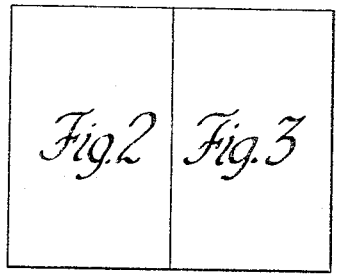

June 13, 1967  H. W. CHRISTENSON ET AL  3,324,797
TRANSMISSION

Original Filed May 10, 1963  3 Sheets-Sheet 1

INVENTORS
Howard W. Christenson,
BY James J. Mooney, Jr. &
Robert H. Schaefer a. m. Heiter
ATTORNEY

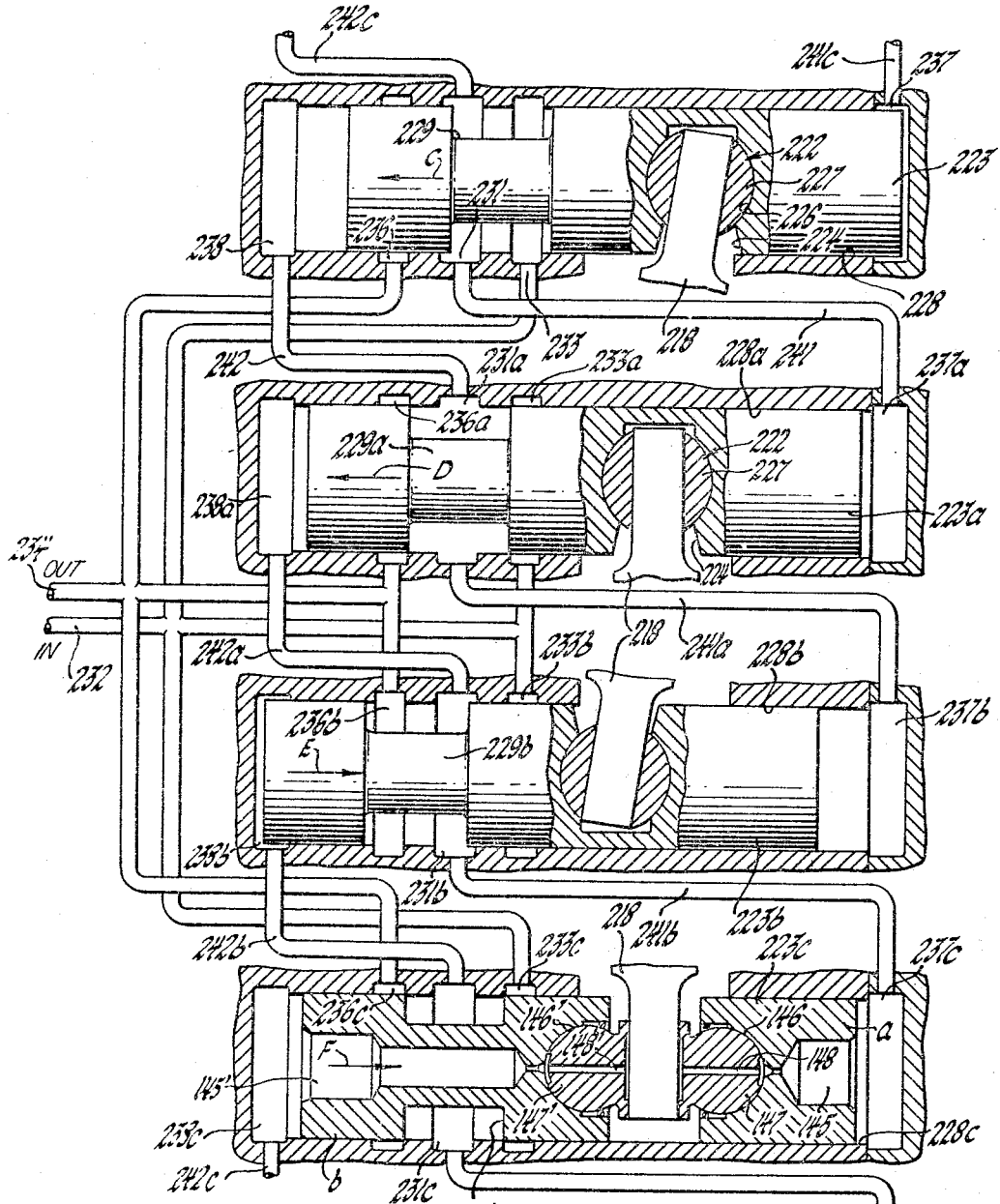
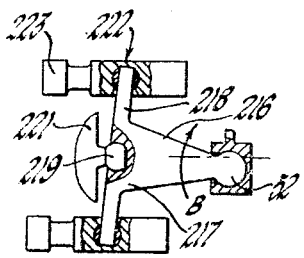
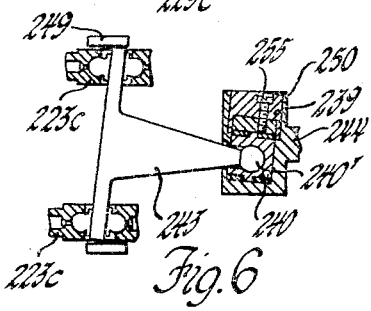

United States Patent Office 3,324,797
Patented June 13, 1967

3,324,797
TRANSMISSION
Howard W. Christenson and James J. Mooney, Jr., Indianapolis, and Robert H. Schaefer, Westfield, Ind., assignors to General Motors Corporation, Detroit, Mich., a corporation of Delaware
Original application May 10, 1963, Ser. No. 279,372. Divided and this application May 31, 1966, Ser. No. 554,189
22 Claims. (Cl. 103—173)

This invention relates to a transmission and more particularly to a hydrostatic transmission pump or motor construction and is a division of the applicants' application Ser. No. 279,372 filed May 10, 1963.

The hydrostatic transmission employs a pump unit driven by the engine and connected by a high pressure fluid power circuit to a motor unit driving the output. The pumps and motors are of the double acting swash plate type which substantially balance the axial thrust on the swash plate. The double acting pistons extend axially and are arranged in a group about the axis. Each piston has a control valve groove intermediate the ends to control the flow to and the exhaust from the cylinder chamber at each end of the double ended pistons. The pistons are connected to the swash plate which is preferably supported by a spherical bearing engaging the perimeter of the swash plate to provide a bearing support and limit movement in one direction. A universal joint connected between the frame and swash plate prevents rotation of the swash plate and axially locates the swash plate by limiting movement in the other direction. The swash plate arm is slidably connected to a ball joint located in the displacement control piston adjustably positioned in a cylinder mounted transversely of the axis of rotation on the pump input or motor output member to provide an adjustable crank drive assembly. A weight is mounted on the control cylinder which moves reversely with respect to the control piston to balance the drive assembly.

An object of the invention is to provide in a hydrostatic torque converter of the multiple piston type a plurality of double acting pistons with each end of the piston operating in a chamber, and with each piston having a control groove cooperating with ports in the body to control the flow of fluid from the inlet to the chambers and to control the flow of fluid from the chambers to the outlet in timed relationship with the movement of the pistons.

Another object of the invention is to provide in a swash plate type hydrostatic torque converter a one-piece double acting piston having a portion on each side of the swash plate.

Another object of the invention is to provide in a swash plate type hydrostatic torque converter having double acting pistons, a two-part piston connected by a nonrigid tie-rod permitting accommodation for slight misalignment between the bores in which the piston parts operate.

Another object of the invention to to provide in a swash plate type hydrostatic torque converter a double acting piston consisting of two separate piston elements retained in contact with the swash plate by supercharging the expansible chambers in which each of the pistons operate.

Another object of the invention is to provide in a swash plate assembly an external annular bearing member engaging the perimeter of the swash plate to support the swash plate for wobble moveemnt.

Another object of the invention is to provide in a swash plate assembly mounted in a housing a universal joint connecting the swash plate to the housing to prevent rotation thereof.

Another object of the invention is to provide in a swash plate assembly mounted in a housing, a spherical bearing supporting the outer perimeter of the swash plate and providing a thrust bearing to prevent movement of the swash plate in one direction, and a thrust rod between the swash plate and the housing to provide a thrust bearing limiting movement in the opposite direction.

Another object of the invention is to provide in a swash plate assembly having a rotatable crank having a variable eccentric control consisting of a piston and a cylinder, a ring gear mounted on the external perimeter of said cylinder to provide the driving connection.

Another object of the invention is to provide in a swash plate assembly having a controlled eccentric having a transversely movable control piston and a transversely movable weight counterbalancing the piston and moving in opposite directions in respect to the control piston.

Another object of the invention is to provide in a piston engaging a swash plate through a spherical bearing a lubrication passage connecting the pumping chamber in which the piston operates to the spherical bearing surface and the surface between the spherical bearing and the swash plate.

Another object of the invention is to provide in a swash plate assembly having a controllable eccentric for the swash plate a cylinder and piston for adjusting the eccentricity of the swash plate arm located at an angle to the axis of rotation of the crank assembly and perpendicular to the swash plate arm in the normal mean position to reduce side loading on the piston.

These and other objects of the invention will be more apparent from the following description and drawing illustrating the preferred embodiments of the invention.

Figure 2:
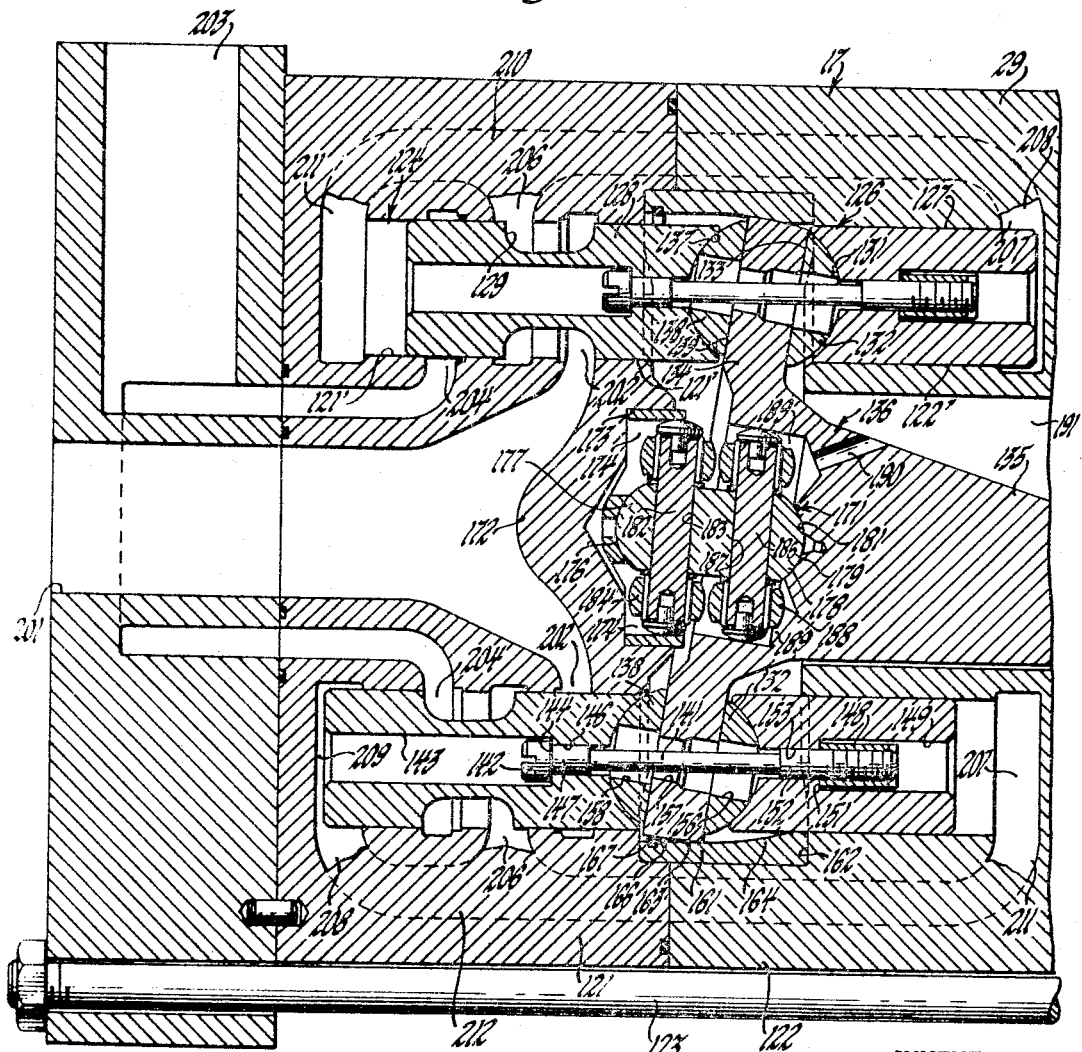
Figure 3:
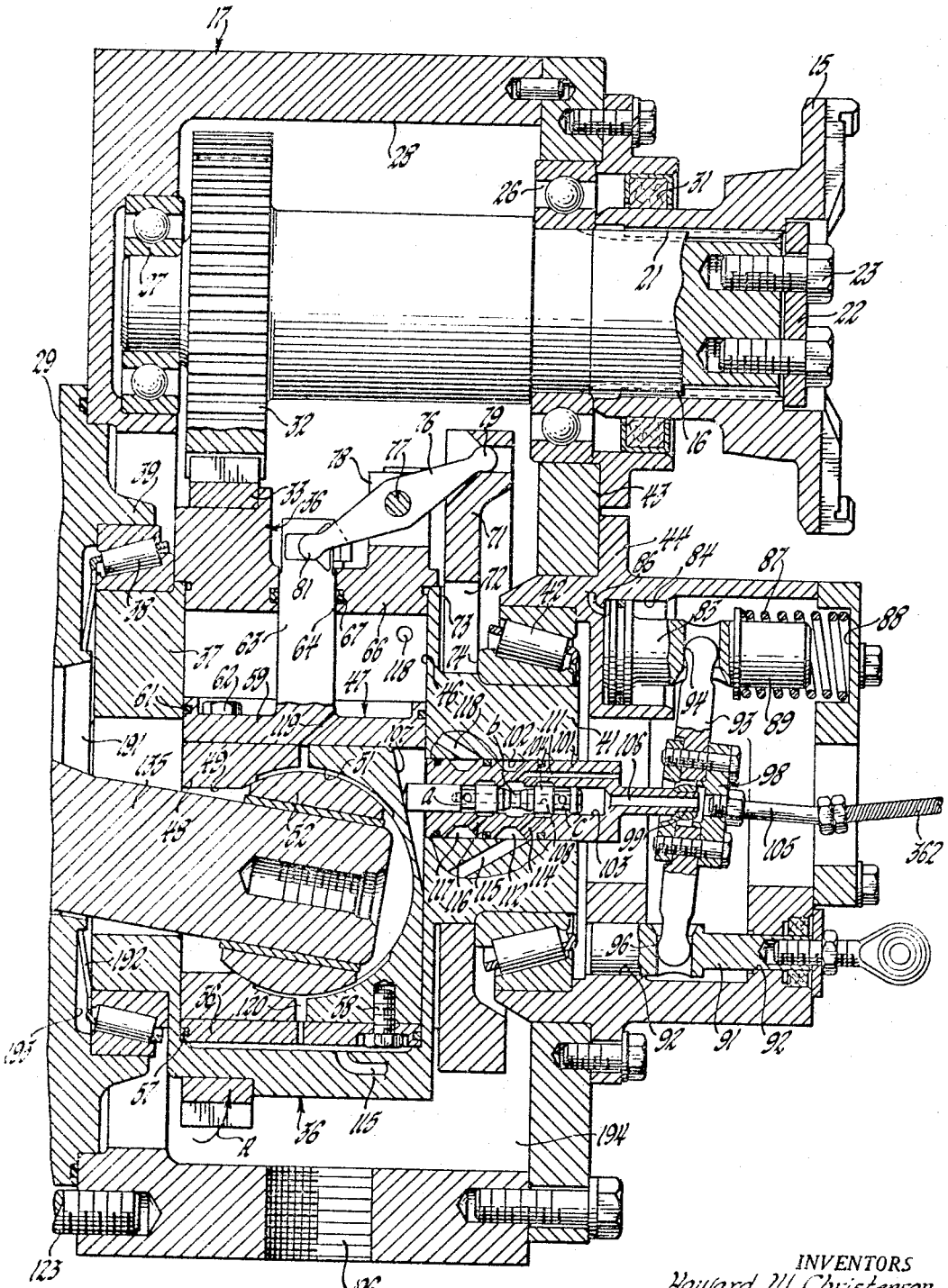

FIGURE 1 is an arrangement of the devices shown in section in each of FIGURES 2 and 3.

FIGURES 2 and 3, when arranged as shown in FIGURE 1, are sectional views of the preferred embodiment of a hydrostatic torque converter employed in this transmission.

FIGURE 4 diagrammatically shows the inlet and outlet connections to the chambers of the hydrostatic torque converter and modified piston constructions.

FIGURE 5 diagrammatically shows a modified swash plate mounting arrangement.

FIGURE 6 diagrammatically shows a modified swash plate mounting arrangement.

*Adjustment crank drive assembly*

The transmission pump unit shown in FIGURE 2 and 3 has the input coupling part 15 secured to the input shaft 16 by splines 21 and locking plate 22, which is secured in place by screws 23. The shaft 16 is rotatably mounted by bearings 26 and 27 in an offset housing portion 28 of the housing 29 for the pump unit 17. A seal 31 located outboard of bearing 26 prevents leakage from the housing around the shaft 16. Shaft 16 drives a spur gear 32 which drives a ring gear 33 secured by suitable keys or locking bolts, not shown, to the crankshaft assembly 36 which has a journal portion 37 at the pump side supported by a tapered roller thrust bearing 38 mounted on the driving wall 39 of the housing 29 and a journal 41 at the control side supported by a tapered roller thrust bearing 42 in the forward wall 43 of the pump housing. The bearings 38 and 42 are coaxial and support the crankshaft assembly 36 for rotation about a fixed axis when driven by the input shaft 16 and gears 32 and 33.

The crankshaft assembly 36 has a transverse cylinder 46 in which the piston 47 is reciprocally mounted. The piston assembly 47 consists of a central light-weight aluminum body 48 having an opening 49 at one side communicating with the internal spherical bearing surface 51 which is formed of two longitudinal halves with the parting plane parallel to the axis of rotation to permit the insertion of spherical bearing 52 having an outer spherical surface and an inner cylindrical surface for the swash plate control arm 135 and steel heads 56 and 59 having piston rings 57 and 61 suitably secured by screws 58 and 62 to the central portion 48. The control head 59 has a control stem 63 extending through an aperture 64 in the removable cylinder head 66 which is suitably secured by ring gear 33 and bolts and sealed and seals the open end of the cylinder bore 46. A seal 67 is located in a groove in the aperture 64 to prevent leakage around stem 63. The ring gear 33 and other suitable securing means retains the head 66 in the position shown closing the bore 46. The other end of the cylinder bore 46 is closed by the integral structure of the crankshaft assembly 36. An annular weight 71 surrounds the journal 41 and has a central elongated aperture 72 having guide surfaces on opposite sides which cooperate with guide surfaces, one guide surface 73 on the external surface of the crankshaft assembly 36, and another guide surface 74 on the inner race of bearing 42. A lever or walking beam 76 pivotally mounted by a pin 77 on a support portion 78 fixed on the head 66 of assembly 36 is pivotally connected by a pivotal connection 79 to the weight 71 and the pivotal connection 81 to the stem 63 of the piston assembly 47. Thus the piston and the weight reciprocate in opposite directions along axes transverse to the axis of rotation of the crankshaft assembly to maintain the crankshaft assembly in balance.

*Pump displacement control valve*

The pump displacement portion of the control system is located in the control housing 44 mounted on wall 43. The engine overload control piston 83 is located in a cylinder 84 in the control housing 44. A fluid pressure signal indicating underspeed is supplied from the engine output speed governor valve to the end of cylinder 84 to act on piston 83 to urge it against the biasing force of spring 87 located between the other vented end of the piston 83 and seat 88 in the end wall of control housing 44. The spring is held in position in the cylindrical recessed seat 88 and fits over a cylindrical part 89 of control piston 83 to guide the control piston for axial movement. A pump stroke control rod 91 is reciprocally mounted on a suitable bore 92 in housing 44. A lever 93 is pivotally connected at one end by the ball and socket connection 94 to the control piston 83 and at the other end by the ball and socket connection 96 to the control rod 91. At a central or other intermediate portion the control lever 93 has a socket 98 to receive the ball 99 on valve element 101 to provide a universal connection between the lever 93 and the control valve element 101 of the pump displacement valve.

The valve element 101 is reciprocally mounted in bore 102 of journal 41 and has an inner bore 103 in which the follower valve 104 is reciprocally mounted. The control fluid is supplied via the control pressure line 362 having a flexible portion 105 connected to the socket 98 to lubricate the ball and socket connection. The fluid acts on the unbalanced area of the ball to hold the ball in sealing engagement with the socket. The fluid is supplied by passage 106 extending through the ball to the bore 103 to act against the unbalanced area of valve element 104 to hold the valve in contact with the cam surface 107 on the piston body 48. Fluid is supplied from bore 103 via passage 108 to the grooves *a* and *c* follower valve element 104, which, in neutral position shown, are blocked. The groobe *b* is connected to exhaust port and passage 111. Movement of the follower valve element 104 to the right or the control valve element 101 to the left will connect the port 112 via passage 114 to exhaust 111 to drain the lower end of the cylinder via passage 115, and to supply fluid via passage 116 and port 117 to the passage 118 connected to the upper end of the cylinder to move the piston 47 to a more eccentric position to increase the pump stroke and displacement. The opposite movement of either the follower valve 104 or the control valve 101 will connect the lower end of the cylinder 46 via passage 115, port 112, passage 114, and groove *c* to the source of fluid supply to decrease pump stroke and connect the upper end of the cylinder via passage 118, port 117, passage 116 and groove *b* to the exhaust passage 111. Thus it will be seen that piston assembly 47 assumes a definite position for each position of the control valve element 101, which is positioned under the joint control of the manual control rod 91 and the governor control piston 83. This provides a joint manual and governor control for the degree of eccentricity of the piston assembly 47 to control the pump stroke and displacement. The fluid supplied to the cylinder by lines 115 and 118 to control the piston position also flows through restricted lubrication passages 119–120 to lubricate ball joint 51–52.

*Swash plate pump*

The cylinder portion of the housing assembly 29 (FIG. 2) is formed of two parts 121 and 122 secured together by tie-rods 123. These parts respectively have a plurality of axial ported cylinder portions 121' and plain cylinder portions 122' aligned to form cylinders 124 located symmetrically in an annular group around the central axis of the pump assembly. Though four equally spaced piston cylinders are illustrated, it will be appreciated that the number may vary in groups of four. The cylinders 124 are closed at each end and have located therein a piston 126, consisting of a plain piston portion 127 at the right and a piston valve portion 128 at the left having control groove 129. The piston portion 127 has at its end adjacent the center a spherical bearing seat 131 cooperating with the spherical surface of bearing 132 formed as a segment of a sphere. The bearing 132 has a flat surface engaging the flat annular surface 133 of plate portion 134 of the swash plate assembly 136. The left piston valve portion 128 also has a spherical bearing seat 137 engaging the spherical surface of the semi-spherical bearing 138. The flat surface of the bearing member 138 engages a flat annular face 139 of the swash plate 134.

The piston portions 127 and 128 are secured together by bolts 141 having a head 142 fitting in a bore 143 in the piston portion 128. The head 142 seats against a shoulder 144 which, in conjunction with the cylindrical shank part 147 closely fitting the reduced diameter bore portion 146, provides a seal and an anchor. At the other end of the bolt 141 a nut 148 is threaded on the bolt and located in a bore 149 in the piston portion 127. The nut 148 is drawn up tight against the shoulder 151 to place the bolt in tension to preload bearings 132 and 138. The bolt also has an unthreaded cylindrical portion 152 fitting a smaller bore portion 153 to provide, in conjunction with the nut 148 engaging shoulder 151, a seal for the bore through piston portion 127. The bolt 141 passes freely through an aperture 156 in the spherical bearing 132, an aperture 157 in the plate 134, and an aperture 158 in the spherical bearing 138 with clearance during all relative movement of these parts. It will be noted that the bolt 141 is only fixed over a short portion of its length at each end relative to the piston portions 127 and 128 and thus has a long relatively flexible shank to permit some minimal lateral displacement of the pistons in case there is an misalignment.

The swash plate assembly 136 is supported for rocking movement in an annular bearing ring 161 secured in a recess 162 in the mating portions 121-122 of the housing assembly. Bearing ring 161 has a cylindrical surface portion 163 meeting a spherical surface portion 164 at its maximum diameter cooperating with the spherical surface portion 166 on the external periphery of the plate 134 of the swash plate assembly 136, in order to support the swash plate assembly for wobble movement and to transmit thrust from the swash plate to the frame to limit rightward movement of the swash plate. A snap ring 167, located at the outboard end of the cylindrical portion 166 of bearing ring 161 provides an anchor for disassembly of the bearing ring.

The axial thrust of the swach plate assembly 136 to the left is transmitted by the universal joint 171 to the portion 172 of the housing 29. The universal joint has a round bearing member 173 secured to the frame part 172 by bolts (not shown) located intermediate the opposed pair of circular bearing bores 174. Centrally located in the bearing member 173 is a spherical bearing 176 cooperating with the adjacent spherical end 177 of the thrust shaft 178. The other end of thrust shaft 178 also has a spherical bearing end 179 cooperating with a spherical bearing surface 181 formed in the end of the arm 135 of the swash plate assembly. A cross pin 182 is located in a bore 183 in the shaft 178 and has at each end a bearing member 184 rotatably fixed to the shaft 182 and axially slidably mounted in the bores 174 to prevent relative rotation and to permit relative tilting movement between the shaft 178 and the bearing part 173 fixed on frame 172. A shaft 186 is located in the bore 187 adjacent the other end of shaft 178 and has bearing members 188 rotatably secured at each end fitting into bores 189 formed in the arm of the swash plate 135 or provided by a separate bearing member like bearing member 173 to prevent relative rotation between the shaft 181 and the swash plate assembly 136 but to permit relative tilting movement. The universal joint 171 transmits thrust from the swash plate assembly 136 to the frame 17 to limit movement of the swash plate assembly to the left and prevents relative rotation between these parts.

Leakage from the hydraulic power circuits fills the cavity 191 in the housing surrounding the swash plate assembly 131 which will be conducted by passage 190 to lubricate the joint assembly 171. The passage 190 is large enough to permit free communication between opposite sides of the swash plaet so that all portions of the chamber 191 are at the same pressure, which is controlled (FIG. 3) by a Belleville spring valve 192 located in an annular recess 193 at bearing 38. When the pressure in chamber 191 exceeds a low predetermined value it moves the Belleville spring 192 to permit flow through the bearing 38 to the dry sump 194 which is connected to the main sump or pump intake via passage 196.

*Pumping operation*

The pump power flow system, shown in FIGURE 2, has a return or inlet line 201 connected to an inlet port 202 for each cylinder 124. The delivery or outlet line 203 is connected to an outlet port 204 for each cylinder. Each cylinder also has a control port 206 located between the inlet port 202 and the outlet port 204 controlled by control or valve groove 129 in the piston. A passage arrangement for a four cylinder pump with the crank assembly 36 rotating clockwise (arrow A, FIG. 3) as viewed from the control end is shown structurally in FIGURE 2 and diagrammatically in FIGURE 4. Referring to FIGURE 2, the closed end of cylinder 122′ at the top has a port 207 at the right connected by a helical passage 208 to the control port 206 of the 90° leading cylinder (not shown as located to the rear of the section shown) and to the port 209 of the second or 180° leading cylinder shown at the bottom. The closed end of the cylinder 121′ at the top has a port 209 at the left connected by a passage 211 to the control port 206 of the next preceding or 90° lagging cylinder at the center on the lagging side (not shown as in front of section shown), and to the right end port 207 of the second preceding or 180° lagging cylinder at the bottom. Passage 210 shown at the top cylinder control port 206 similarly extends helically to the port 209 of the 90° leading cylinder at the back, (not shown) and the port 207 of the 90° lagging cylinder at the front (not shown). Passage 212 shown connected to control port 206 of the lower cylinder extends to port 209 of the 90° leading cylinder at the front and port 207 of the 90° following cylinder at the rear. It will thus be seen that a plurality of similarly arranged helical passages, one for each cylinder each connecting the control port of one cylinder to the port 209 of a 90° leading cylinder and the port 207 of a 90° lagging cylinder. When the adjustable crank assembly 36 is rotated clockwise (arrow A) as viewed from the control or input end with the piston holding the swash plate arm 135 in an eccentric position, the swash plate sequentially reciprocates the pistons 126 to actuate the control valving to connect the inlet to each cylinder end or expanding chamber and the outlet to each contracting chamber and to reciprocate the pistons to sequentially expand and contract each chamber at each end of the pistons. The pumping action is further explained below and diagrammatically shown in FIGURE 4 which also shows structural modifications.

*Pump modification*

FIGURE 4 diagrammatically shows the fluid connections between the pump cylinders for the pump or motor shown in FIGURES 2 and 3 and with FIGURES 5 and 6 shows modified piston and swash plate assembly constructions. They may be driven by the eccentric drive assembly illustrated in FIGURES 3 or 6. Referring to FIGURES 4 and 5, the first modification has a drive bearing 52 driven by the adjustable eccentric or crankshaft assembly 36 of FIGURE 3 mounted on the arm 216 of the swash plate assembly 217. At the center line of the plate portion 218 of the swash plate assembly, the swash plate is supported by a universal bearing 219 on a portion of the pump frame 221.

The swash plate drives the pistons 223, 223a, 223b, 223c located in cylinders 228, 228a, 228b, 228c. The structure of all the pistons and cylinders is the same and is described with reference to piston 223 and cylinder 228. As shown in detail in FIGURE 4, the spherical bearing assembly 222 connects each piston to the swash plate, is formed by forming in the piston 223 a recess 224 having opposed spherical seats 226 each receiving a semi-spherical bearing slipper 227 having a spherical surface engaging the spherical seat in the piston, and a flat surface engaging the flat annular face of the swash plate 218.

The piston 223 fits in a bore or cylinder 228 and has a control groove 229 to control the inlet and outlet lines. Each cylinder 228 has a control port 231 centrally located with respect to the length traversed by the recess 229 during piston movement and always connected to recess 229. The inlet line 232 is connected to the inlet port 233 while the outlet line 234 is connected to the outlet port 236 of each cylinder. The right end of each cylinder has a port 237 connected to line 241 and the left end a port 238 connected to line 242.

Reading down in FIGURE 4, the top, front, and bottom and rear pistons are diagrammatically shown. After the top piston assembly, the others are indicated respectively by the letters *a*, *b* and *c* appended to the reference numerals. The pistons 223, 223a, 223b and 223c are at at top, front, bottom and back, respectively. Each control port 231 is connected by a line 241 to the right end port 237 of a 90° lagging cylinder, such as control port 231 is connected by line 241 to right port 237a. Each control port 231 is also connected by a line 242 to the left port 238 of a 90° leading cylinder, such as control port 231 is connected by line 242c to the left port 238c. The inlet and outlet lines are commonly connected respectively to the inlet port 233 and outlet port 236 of each cylinder.

*Pumping action*

When the swash plate arm end or bearing 52 is rotated in a clockwise eccentric path (arrow B) as viewed from the control end, the piston 223, as shown in FIG. 4, is just starting to move to the left as indicated by the arrow C on a pumping stroke to pump fluid through port 238, line 242 and port 231a, which is just being connected by groove 229a as the piston 223a moves (arrow D) to outlet port 236a to supply fluid to the outlet line 234. Also, as piston 223 starts to move, the inlet line 232 will be connected via port 233c, groove 229c of piston 223c moving as indicated by arrow F and line 241c to port 237 to supply fluid to charge the right end of the cylinder for pumping on the return stroke. Piston 223a is in the middle of the stroke moving in the direction indicated by the arrow D pumping fluid through port 238a, line 242a to port 231b, port 236b and the outlet line 234. Fluid is being supplied to the right end of cylinder 228a from the inlet line 232 via ports 233, 231 at piston 223 and line 241 to port 237a. The other pistons are supplied in a similar manner, and it will thus be seen that a continuous thrust balanced double-acting pump with the pump piston control groove controlling inlet and outlet flow is provided by the arrangements illustrated in FIGURES 1–6. Reversing direction of rotation will reverse oil flow. Any multiple of 4 pistons may be used.

*Other pump modifications*

FIGURE 4 also shows a modified piston 223c which may be used with the swash plate 136 and drive assembly 36 of FIGURES 2 and 3 or the swash plate assembly 243 and drive assembly 244 of FIGURE 6. The piston 223c has two parts *a* and *b* having respectively restricted lubrication passages 145 and 145' connected to spherical bearing sockets 146 and 146'. The slipper bearings 147 and 147' have a spherical part fitting sockets 146 and 146', and a flat surface engaging the swash plate 243. The pump inlet is supercharged with a substantial pressure, i.e., 100 p.s.i., to hold the piston parts and slipper against the swash plate. The high pressure lubricating oil being pumped by the pump is conducted from the pump cylinder by passages 145 and 145' which are restricted to control the amount of lubricant supplied to the spherical bearing surfaces and supplied by passages 148 and 148', which have a laterally enlarged initial portion so they are always connected to passages 145 and 145' to the flat surfaces. Both the flat and spherical surfaces have recessed areas to hydraulically reduce the loading and may have connecting lateral or radial lubricating passages. The plate of swash plate assembly 243 extends radially beyond the pistons 223c and is supported on its external perimeter by a cylindrical bearing 249 mounted on the housing. The crank assembly 250 is similar to the crank assembly of FIGURE 3, but the arm of the swash plate assembly 243 is connected by a universal ball joint 240' transmitting thrust in both directions to the piston 240. The cylinder 239 and piston 240 are mounted at an angle to the axis of rotation of the swash plate and substantially perpendicular to the axis of the arm of the swash plate assembly 243 when in the means control position from a standpoint of total linear movement for control or when in the normal position during operation to minimize the lateral thrust transmitted from the piston to the cylinder so that most thrust is transmitted through the control fluid.

*Motor*

The above described pumps may be used as motors without change if manual motor displacement control is desired. Suitable automatic motor displacement controls are described below in connection with the transmission systems shown in the above application Ser. No. 279,372. When high pressure fluid is supplied to the fluid inlet line in the above pumps, they will rotate the crank assembly in the direction it is driven as a pump to drive the output which is connected through gearing to the vehicle drive mechanism. The motors preferably have a stop member to limit movement of the displacement control piston below a predetermined low displacement. FIGURE 6 shows a stop 255 on the piston 240 preventing reduction of displacement below one-half displacement. The stop can be on the cylinder.

The above preferred embodiments are illustrative of the invention and it will be appreciated that they may be modified within the scope of the appended claims.

We claim:

1. In a hydraulic machine, a cylinder housing having a plurality of cylinders arranged in an annular sequence about the axis of the cylinder housing and each cylinder being parallel to the axis of the cylinder housing, said cylinders having closed ends providing a pumping chamber at each end of the cylinders and a pumping chamber port for supplying fluid to and delivering fluid from each pumping chamber, said cylinder housing having a central opening located about the axis of the cylinder housing with a transverse portion of said opening extending into each cylinder centrally of the cylinder, each cylinder having between one end and said central transverse opening portion an inlet port and an outlet port with a controlled port therebetween, piston assembly means located in each of said cylinders for reciprocation between one and another positions having one piston unit means in said one end of said cylinder having valve means selectively connecting said inlet port to said controlled port in one position and said outlet port to said controlled port in the other position, and other piston unit means in the other end of said cylinder, an inlet passage connected to each of said inlet ports, an outlet passage connected to each of said outlet ports, each of said controlled ports being connected to one pumping port of the next following cylinder and to the other pumping port of the next preceding cylinder, a shaft rotatably mounted on said cylinder housing, drive connecting means interconnecting each of said piston assembly means and said shaft for concurrent sequentially reciprocation of each of said piston assembly means in each of said cylinders and rotation of said shaft.

2. The invention defined in claim 1 and said drive connecting means including a swash plate assembly having a swash plate with a peripheral portion connected to each of said piston means and an arm portion eccentrically rotated by a crank assembly.

3. The invention defined in claim 1 and said drive connecting means includig a swash plate extending through said transverse opening through said cylinder and piston assembly and bearing means located externally of said cylinders engaging and supporting said swash plate.

4. The invention defined in claim 1 said drive connecting means including a swash plate, and a partial spherical bearing located externally of said plurality of cylinders engaging the perimeter of said swash plate.

5. The invention defined in claim 1 and said piston assembly means being a one piece construction having a central recess with facing semi-spherical bearing seats located on said piston assembly means, said drive connecting means including a swash plate, and partial spherical bearing members having a spherical portion engaging said bearing seats and a flat portion engaging said swash plate.

6. The invention defined in claim 1 and each of said piston assembly means being a two piece construction having separate piston unit means each having semi-spherical bearing seats located on the facing ends means, said drive connecting means including a swash plate, partial spherical bearing members having a spherical portion engaging said bearing seats and a flat portion engaging said swash plate, and means holding each of said piston unit means in engagement with said swash plate.

7. The invention defined in claim 1 and each of said piston assembly means being a two piece construction with separate piston unit means each having semi-spherical bearing seats located on the facing ends, said drive connecting means including a swash plate, partial spherical bearing members having a spherical portion engaging said bearing seats and a flat portion engaging said swash plate, and tie bolt means for securing each piston assembly means together extending through the two piston unit means, the two partial spherical bearing members and said swash plate with clearance to hold said piston assembly means together and to permit adjustment for proper alignment.

8. The invention defined in claim 1 and said drive connecting means including a swash plate, a partial spherical bearing located externally of said plurality of cylinders engaging the perimeter of said swash plate to support said swash plate for movement and limit movement in one axial direction, and a universal joint having a thrust member interconnecting said cylinder housing and said swash plate to limit axial movement of said swash plate in the opposite direction and to prevent rotation of said swash plate.

9. The invention defined in claim 1 and said drive connecting means including a swash plate assembly having a swash plate operatively connected to each of said piston assembly means, an arm extending from said plate, and a control cylinder transversely mounted on said shaft having a piston reciprocably mounted in said power cylinder, means connecting said piston and arm, and fluid control means connected to said cylinder to vary the position of said piston in said cylinder.

10. The invention defined in claim 1 and said drive connecting means including a swash plate assembly having a swash plate operatively connected to each of said piston assembly means, an arm extending from said plate, and a control cylinder transversely mounted on said shaft having a piston reciprocably mounted in said power cylinder, means connecting said piston and arm, and fluid control means connected to said cylinder to vary the position of said piston in said cylinder including valve elements mounted coaxially on said shaft, and a ring gear output member mounted coaxially with said shaft, surrounding said control cylinder and being secured to said control cylinder.

11. In a hydraulic machine, a frame, a swash plate mounted for wobbling movement on said frame having an arm, a crank assembly mounted for rotation about an axis having a transverse cylinder, a piston in said cylinder operably connected to said arm, valve means to control said piston mounted on said axis, a gear mounted on said cylinder, drive means connected to said gear.

12. The invention defined in claim 11 and said cylinder having a removable head, and said gear being a ring gear surrounding said cylinder in a plane transverse to the axis of rotation of said crank assembly and securing said head in place.

13. The invention defined in claim 11 and said arm extending axially from one side of said piston, a control valve having a manually movable part and a part operably connected to the other side of said piston and both of said valve parts being located coaxially with said axis.

14. In a hydraulic machine, a frame, a rotatable member rotatably mounted on said frame for rotation about an axis, a cylinder mounted transversely on said rotatable member for rotation with said rotatable member, a piston mounted in said cylinder for reciprocating movement transversely of the axis of said rotatable member, a weight mounted on said rotatable member for rotation with said rotatable member and for reciprocating movement transversely of the axis of said rotatable member, and means interconnecting said piston and weight to move said piston and weight in opposite directions to maintain said rotatable member in balance during reciprocating movement of said piston.

15. The invention defined in claim 14 and said weight being annular and surounding said rotatable member.

16. In a hydraulic machine a cylinder housing having a plurality of cylinders located in an annular arrangement about the axis of the housing with each cylinder parallel to the axis of the housing and having a central cavity about said axis communicating with each of said cylinders at a point centrally of said cylinders, each of said cylinders being closed at the opposite ends and having a central opening, piston means in each of said cylinders consisting of a separate piston member in each end of said cylinders, swash plate means located in said central cavity of said cylinder housing having a plate portion extending into said cylinders and located between each of said separate piston members, an inlet passage, an outlet passage, each of said pistons and cylinders having porting means to sequentially supply fluid from said inlet passage to each end of each cylinder and receiving fluid pumped from each end of each cylinder for connection to said outlet passage, and pump means to supply supercharging pressure to said inlet passage sufficient to maintain said piston members in contact with said swash plate.

17. In a hydraulic machine, a frame having cylinders located about the axis, a swash plate assembly having a plate having a circular perimeter and an arm, drive crank means connected to said arm to move said arm about an axis to wobble said plate, a plurality of pistons reciprocally mounted in said cylinders and operatively connected to said plate, and a main radial load supporting bearing mounted on said frame and engaging said circular perimeter of said plate to support said swash plate for wobbling movement.

18. The invention defined in claim 17, said circular perimeter and said bearing having spherical surfaces to limit movement of said swash plate in at least one direction.

19. The invention defined in claim 17, said circular perimeter and said bearing having spherical surfaces comprising an annular section of a sphere having the maximum diameter at one side and the minimum diameter at the other side permitting assembly of a one piece plate and a one piece bearing and limiting axial movement of said plate in only one direction.

20. The invention defined in claim 17, said circular perimeter and said bearing having spherical surfaces comprising an annular section of a sphere having the maximum diameter at one side and the minimum diameter at the other side permitting assembly of a one piece plate and a one piece bearing and limiting axial movement of said plate in only one direction, and universal joint means connected between said swash plate and frame to prevent relative rotation and to limit axial movement of said swash plate in the opposite direction and to permit radial movement.

21. In a hydraulic machine; a frame having fluid displacement means; a swash plate having a plate and an arm; said plate being operatively connected to said fluid displacement means; means to provide an adjustable eccentric drive connected to said arm including a drive member mounted for rotation about an axis, a motor mounted on said drive member having a piston operably connected to said arm and movable transversely of the axis of said drive member for adjusting the eccentricity of said arm, and said piston moving on an axis perpendicular to the axis of said arm at the high load mean of its movement.

22. In a hydraulic machine; a frame; a swash plate mounted for wobbling movement on said frame and having an arm; a drive member mounted on said frame for rotation about an axis and having a cylinder extending transversely of said axis; a piston in said cylinder operably connected to said arm; a source of fluid under pressure;

control valve means for selectively connecting said source to opposite ends of said cylinder for positioning said piston in accordance with the position of control means including a valve bore, a valve sleeve member mounted in said bore, a valve plug member mounted in said valve sleeve member; control means to move one of said valve members; means operably connecting the other of said valve members to said piston to position said other valve member in accordance with the position of said piston.

References Cited

UNITED STATES PATENTS

| Re. 21,758 | 4/1941 | Foisy | 103—162 X |
| 1,711,967 | 5/1929 | Robson. | |
| 2,083,020 | 6/1937 | High | 103—173 X |
| 2,732,808 | 1/1956 | Stoyke | 103—173 |

FOREIGN PATENTS 245,099    3/1912    Germany.

ROBERT M. WALKER, *Primary Examiner.*